(12) United States Patent
Feng et al.

(10) Patent No.: US 12,517,999 B2
(45) Date of Patent: Jan. 6, 2026

(54) DATA PROCESSING METHOD, SECURITY ARCHITECTURE SYSTEM, AND COMPUTING DEVICE

(71) Applicant: Phytium Technology Co., Ltd., Tianjin (CN)

(72) Inventors: Yanzhao Feng, Tianjin (CN); Nan Jiang, Tianjin (CN); Yufeng Guo, Tianjin (CN); Zhuo Ma, Tianjin (CN); Ming Zhang, Tianjin (CN); Qiaoqiao Hu, Tianjin (CN); Qingshan Zhu, Tianjin (CN)

(73) Assignee: Phytium Technology Co., Ltd., Tianjin (CN)

( * ) Notice: Subject to any disclaimer, the term of this patent is extended or adjusted under 35 U.S.C. 154(b) by 240 days.

(21) Appl. No.: 17/993,462

(22) Filed: Nov. 23, 2022

(65) Prior Publication Data
US 2023/0161868 A1    May 25, 2023

(30) Foreign Application Priority Data
Nov. 24, 2021  (CN) .......................... 202111398364.6

(51) Int. Cl.
G06F 21/53        (2013.01)

(52) U.S. Cl.
CPC ........ *G06F 21/53* (2013.01); *G06F 2221/034* (2013.01)

(58) Field of Classification Search
CPC ........ G06F 1/3296; G06F 1/28; G06F 21/755; G06F 21/81
See application file for complete search history.

(56) References Cited

U.S. PATENT DOCUMENTS

| 7,730,248 | B2* | 6/2010 | Goss ..................... G06F 1/3296 710/261 |
| 2015/0121519 | A1* | 4/2015 | Hauke .................. G06F 21/755 726/22 |
| 2016/0056795 | A1 | 2/2016 | Singh |
| 2020/0104537 | A1* | 4/2020 | Rosay ..................... G06F 21/81 |
| 2021/0313989 | A1* | 10/2021 | Liu .......................... G06F 21/81 |

FOREIGN PATENT DOCUMENTS

| CN | 103778014 A | 5/2014 |
| CN | 107562397 A | 1/2018 |
| CN | 113589882 A | 11/2021 |

* cited by examiner

*Primary Examiner* — Joe Chacko
(74) *Attorney, Agent, or Firm* — ANOVA LAW GROUP, PLLC (57) ABSTRACT

A data processing method applicable to a security architecture system. The security architecture system includes a secure element subsystem, the secure element subsystem includes a power management module and a register, and a communication connection is established between the power management module and the register. The method includes: obtaining, by the power management module, a state of the register through the power management module, and selecting a first adjustment method or a second adjustment method based on the state of the register to adjust a frequency of a target component.

12 Claims, 5 Drawing Sheets

DATA PROCESSING METHOD, SECURITY ARCHITECTURE SYSTEM, AND COMPUTING DEVICE

CROSS-REFERENCE TO RELATED APPLICATION

This application claims priority to Chinese Application No. 202111398364.6, filed on Nov. 24, 2021, the entire content of which is incorporated herein by reference.

TECHNICAL FIELD

The present disclosure is related to the field of integrated circuits and, more specifically, to a data processing method, a security architecture system, and a computing device

BACKGROUND

A system-on-a-chip (SoC) integrates multiple processor cores and multiple peripheral devices. These processor cores and peripheral device may require different voltages and frequencies. Generally, a SoC integrates a dynamic voltage and frequency scaling (DVFS) module to dynamically adjust the voltage and frequency of the processor core and some peripheral devices. Voltage and frequency are key factors in ensuring correct functioning of digital circuits. Inappropriate voltage or frequency can violate timing constraints and cause digital circuits to produce incorrect outputs.

SUMMARY

In accordance with the disclosure, embodiments of the present application provide a data processing method, which can be applied to a security architecture system. The security architecture system includes a secure element subsystem. The secure element subsystem includes a power management module and a register, and a communication connection is established between the power management module and the register. The data processing method includes obtaining, by the power management module, a state of the register; and selecting a first adjustment method or a second adjustment method based on the state of the register to adjust a frequency of a target component.

In accordance with the disclosure, embodiments of the present application provide a security architecture system having a secure element subsystem. The secure element subsystem includes a power management module and a register, and a communication connection is established between the power management module and the register. The power management module is configured to select a first adjustment method, or a second adjustment method based on a state of a register to adjust the frequency of a target component.

In accordance with the disclosure, embodiments of the present application provide a computing device including a security architecture system. The security architecture system includes a secure element subsystem, and the secure element subsystem includes a power management module and a register. The power management module is configured to select a first adjustment method, or a second adjustment method based on a state of the register to adjust a frequency of a target component.

BRIEF DESCRIPTION OF THE DRAWINGS

To clearly illustrate the technical solutions in the embodiments of the present disclosure, the drawings used in the description of the embodiments will be briefly described below. It is obvious that the drawings in the following description are only some embodiments of the present disclosure. For those having ordinary skills in the art, other drawings can be obtained according to these drawings without inventive efforts. It should be noted that similar reference numerals and letters denote similar items in the accompanying drawings, and therefore, once an item is defined in a drawing, there is no need for further discussion in the accompanying drawings.

In some embodiments, the same reference numerals may refer to the same components or units.

DETAILED DESCRIPTION OF THE EMBODIMENTS

In the following, specific embodiments of the present disclosure will be described in detail with reference to the accompanying drawings. Although the present disclosure will be described with reference to the specific embodiments, the present disclosure is not limited to the embodiments. Furthermore, the present disclosure includes various modifications, replacements or equivalents that are made without departing from the scope of the present disclosure as defined by the appended claims. It should be noted that, steps in the method may be implemented by any functional blocks or functional layouts, and the functional blocks or the functional layouts may be implemented as physical entities, logical entities, or combination thereof.

In order for a person skilled in the art to better understand the present disclosure, the present disclosure is further described in detail below with reference to the accompanying drawings and the specific embodiments.

It should be noted that the example to be described below is merely one specific example, and not intended to limit the embodiments of the present disclosure to the specific shown and described shapes, hardware, connection relationships, steps, values, conditions, data, orders, etc. A person skilled in the art can apply the inventive concept of the present disclosure to construct more embodiments not mentioned in this specification by reading this specification.

The terms used in this specification are those general terms currently widely used in the art in consideration of functions regarding the present disclosure, but the terms may vary according to the intention of one of ordinary skill in the art, precedents, or new technology in the art. Also, specified terms may be selected by the applicant, and in this case, the detailed meaning thereof will be described in the detailed description of the present disclosure. Thus, the terms used in the specification should be understood not as simple names but based on the meaning of the terms and the overall description of the disclosure.

Flowcharts are used in the present disclosure to illustrate operations performed by the system according to some embodiments of the present disclosure. It should be understood that the preceding or following operations may not be necessarily performed exactly in order. Instead, various steps may be processed in reverse sequence and/or simultaneously. Moreover, other operations may also be added into these procedures, or one or more steps may be removed from these procedures.

The relevant terms used in the present disclosure will be described below.

A common execution environment (also known as a rich execution environment (REE)) can run traditional operation systems (OS) and common programs, and store common information based on the common areas on the SoC.

A Trusted Execution Environment (TEE) can provide functions such as isolated execution, secure communication, and secure storage based on the secure areas on the SoC to ensure the integrity, confidentiality and availability of sensitive information in the TEE, and provide secure services for the REE.

A secure element (SE), generally in the form of a chip, is used to prevent external malicious attacks and protect data security. Generally, the security of the SE is higher than the security of the TEE, which is higher than the security of the REE.

With the increasing demand for security in computer systems, more and more security technologies are being applied to various computer systems. In particular, the TEE technology has become an important part of security systems. Most processors already support the TEE and the REE. The TEE is used to execute trusted programs with specific function, while the REE is used to execute common programs with rich functions, and the TEE can provide various security services for the REE. Generally, application security requirements in the REE are relatively low, and application security requirements in the TEE are relatively high. The cooperation between the TEE and the REE can establish a relatively secure and feature-rich computer system.

Voltage and frequency are key factors in ensuring that circuits function correctly. Generally, digital circuits include multiple electronic components. For an electronic component, it takes a specific period of time to produce a stable and unambiguous output result for a given input data. Therefore, a timing constraint needs to be satisfied between two flip-flops to ensure that the information in the digital circuit is effectively processed.

More specifically, in order to make the output result of the next-level flip-flop meet expectation, the following relationship needs to be satisfied:

$$T_{src} + T_{transfer} \leq T_{clk} - T_{setup} - T\epsilon$$

where $T_{src}$ represents the time required for the flip-flops to provide a stable output after receiving the rising edge of the clock pulse. $T_{transfer}$ represents the time required to transfer the stable data output from the flip-flop to the next flip-flop, that is, the execution time of the intermediate combinational logic unit. $T_{clk}$ represents the clock period of the synchronous clock pulse, which reflects the clock frequency of the circuit. $T_{setup}$ represents the shortest amount of time that the data needs to be maintained by the next-level flip-flop. For a given flip-flop, its $T_{setup}$ may be fixed. $T\epsilon$ represents a very small constant, which is used to reserve a brief period of time beyond the $T_{setup}$ to ensure that all data has been transmitted correctly.

In some implementations, multiple processor cores in most central processing units (CPUs) share the same hardware voltage manager. That is, all processor cores use the same voltage. If the voltage of one processor core is changed, the voltage of other processor cores will also change synchronously. If the voltage and frequency of one processor core are independent of other processor cores, an attacker can find the victim's processor core, fix its frequency, and select a lower-than-expected voltage, which would cause the victim's processor core to generate a hardware error. Attackers can use this type of attack to obtain data (such as keys, etc.) in a highly secure execution environment, skip signature verification and identity authentication mechanisms, etc., which presents great security risks.

More specifically, the attacker's process runs on a low-frequency processor core and the victim's process runs on a high-frequency processor core. The attacker's process can provide a short-term faulty voltage. By controlling the magnitude of the voltage, the voltage has no effect on the processor core where the attacker's process is located, but can cause hardware errors in the processor core where the victim's process is located, thereby affecting the victim's process. Attackers can use this type of attack to obtain data (such as keys, etc.) in a highly secure execution environment, skip signature verification and identity authentication mechanisms, etc., which presents great security risks.

In order to overcome the situation described above, embodiments of the present disclosure provide a data processing method which can be applied to a security architecture system. The security architecture system may include a secure element (SE) subsystem, and the SE subsystem may include a power management module and a register. A communication connection may be established between the power management module and the register. The data processing method may include obtaining a state of the register through the power management module, and selecting a first adjustment method or a second adjustment method based on the state of the register to adjust a frequency of a target component.

Correspondingly, embodiments of the present disclosure further provide a security architecture system and a computing device corresponding to the above data processing method.

Consistent with the present disclosure, by setting the power management module and the register in the SE subsystem, the SE subsystem with higher security, the dynamic frequency modulation process can only be accessed by the SE subsystem, while other subsystems with lower security (e.g., the TEE subsystem and the REE subsystem with lower security than the SE subsystem) cannot directly access the dynamic frequency modulation process. Accordingly, the security and stability of the security architecture system are effectively improved.

Figure 1:
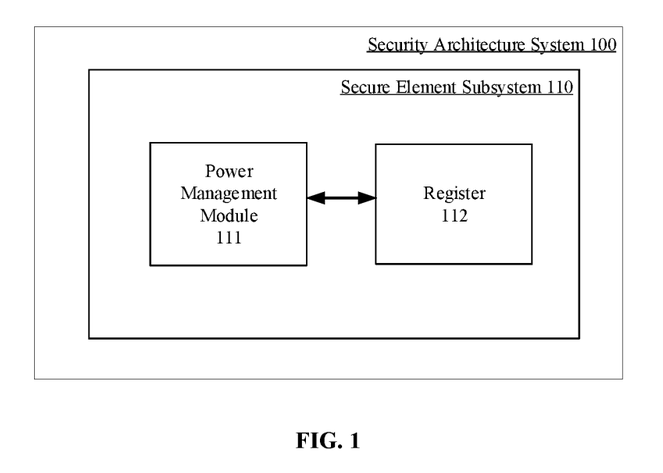
FIG. 1 is a schematic block diagram of a security architecture system according to some embodiments of the present disclosure.
Figure 2:
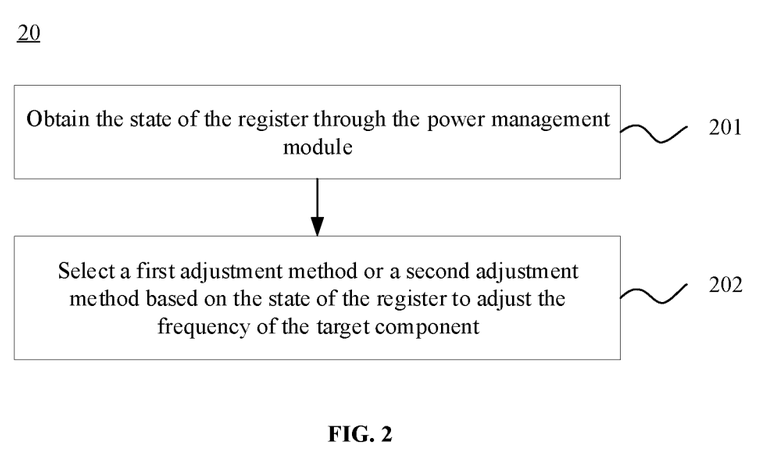
FIG. 2 is a flowchart of a data processing method according to some embodiments of the present disclosure.

FIG. 1 is a schematic block diagram of a security architecture system 100 according to some embodiments of the present disclosure, and FIG. 2 is a flowchart of a data processing method 20 according to some embodiments of the present disclosure.

In some embodiments, the data processing method 20 shown in FIG. 2 may be applied to the security architecture system 100 shown in FIG. 1. In some embodiments, the security architecture system 100 may be a SoC or a portion thereof, or other suitable system or a portion thereof capable of perform logic operations and data processing. The present disclosure does not limit the specific form of the security architecture system, which can be set based on actual needs.

As shown in FIG. 1, the security architecture system 100 includes a SE subsystem 110. The SE subsystem 110 includes a power management module 111 and a register 112, and a communication connection may be established between the power management module 111 and the register 112.

It should be noted that a communication connection may be established between the power management module 111 and the register 112 in the SE subsystem 110. In some embodiments, as shown in FIG. 1, the power management module 111 and the register 112 may be independently set. In other embodiments, the register 112 may be set in the power management module 111, which is not limited in the embodiments of the present disclosure, as long as the power management module 111 and the register 112 are both set in the SE subsystem 110, and there is a communication connection between the power management module 111 and the register 112. The present disclosure does not limit the specific connection method between the power management module 111 and the register 112.

In some embodiments, the target component may be one or more of a processor core whose frequency is to be adjusted, an input/output (I/O) controller, and an on-chip interconnect network in the security architecture system 100. The present disclosure does not limit the specific form of the target component, which can be set based on actual needs.

It should be noted that the security architecture system 100 may also include other modules, components, subsystems, execution environments, etc. The present disclosure does not limit the specific composition of the security architecture system, which can be set based on actual needs.

In some embodiments, the data processing method 20 that can be applied to the security architecture system 100 will be described in detail below. It should be noted that, in the embodiments of the present disclosure, the processes in the data processing method 20 may be performed sequentially, or performed in other adjusted sequences, and some or all of the processes in the data processing method 20 may also be performed in parallel. The present disclosure does not limit the execution order of the processes in the data processing method 20, which can be set based on actual needs. For example, in some embodiments, the processes in the data processing method 20 may be selectively performed, and additional processes may also be added to the processes in the data processing method 20.

201, obtaining the state of the register through the power management module.

In some embodiments, since a communication connection can be established between the power management module 111 and the register 112, the power management module 111 may directly obtain the state of the register 112 from the register 112.

202, selecting a first adjustment method or a second adjustment method based on the state of the register to adjust the frequency of the target component.

In some embodiments, the power management module 111 may select the first adjustment method or the second adjustment method based on the state of the register 112 to adjust the frequency of the target component.

It should be noted that, in the embodiments of the present disclosure, the first adjustment method may be a software adjustment method, and the second adjustment method may be a hardware adjustment method.

Therefore, by using the data processing method 20 provided by the embodiments of the present disclosure, and setting the power management module 111 and the register 112 in the SE subsystem 110 with higher security, dynamic frequency modulation process can only be accessed by the SE subsystem 110. Accordingly, the security and stability of the security architecture system 100 are effectively improved.

The following will describe the data processing method in detail when the software adjustment method (the first adjustment method) and the hardware adjustment method (the second adjustment method) are respectively adopted.

Figure 3:
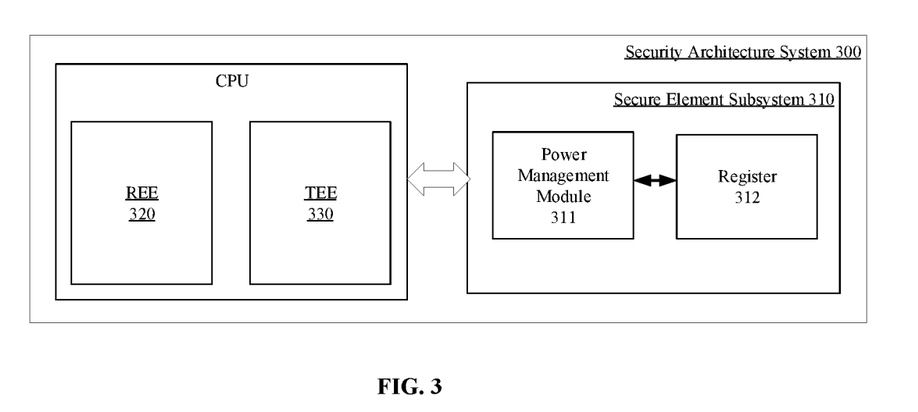
FIG. 3 is a schematic diagram of another security architecture system according to some embodiments of the present disclosure.
Figure 4:
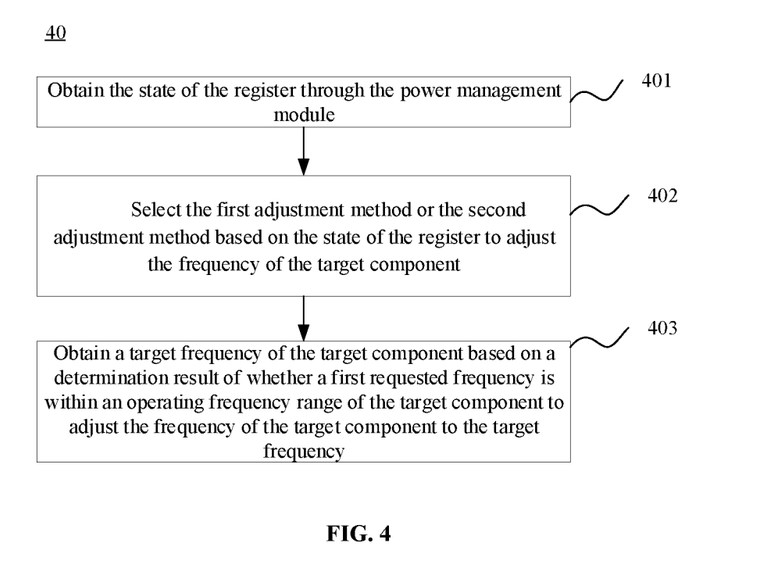
FIG. 4 is a flowchart of the data processing method adopting a first adjustment method according to some embodiments of the present disclosure.

FIG. 3 is a schematic diagram of a security architecture system 300 according to some embodiments of the present disclosure, and FIG. 4 is a flowchart of a data processing method 40 adopting the first adjustment method according to some embodiments of the present disclosure.

In some embodiments, as shown in FIG. 3, the security architecture system 300 includes a SE subsystem 310, a REE subsystem 320, and a TEE subsystem 330. The SE subsystem 310 includes a power management module 311 and a register 312. A communication connection may be established between the power management module 311 and the register 312, and a dedicated interaction channel may be established between the SE subsystem 310, and the REE subsystem 320 or the TEE subsystem 330.

In some embodiments, when the power management module 311 selects the software adjustment method (the first adjustment method) to adjust the frequency of the target component based on the state of the register 312, the data processing method 40 including processes 401-403 that are applicable to the security architecture system 300 shown in FIG. 3 may be performed. More specifically, the processes at 401 and 402 in the data processing method 40 are substantially the same as the processes at 201 and 202 in the data processing method 20 shown in FIG. 2, which will not be repeated here for brevity.

403, obtaining a target frequency of the target component based on a determination result of whether a first requested frequency is within an operating frequency range of the target component to adjust the frequency of the target component to the target frequency. The first requested frequency is included in a first frequency modulation request, and the first frequency modulation request comes from the REE subsystem or the TEE subsystem.

In the embodiments of the present disclosure, by performing the process at 403, the SE subsystem 310 may determine the target frequency of the target component based on the determination result, which can ensure the normal operation of the target component, thereby improving the stability of the security architecture system.

In some embodiments, the operating frequency ranges of individual components may be stored in the SE subsystem (e.g., in the memories, registers, etc. of the SE subsystem) in a tabular form, which is not limited in the embodiments of the present disclosure. In some embodiments, a processor core may operate from 1 MHz to 3 GHz. In some embodiments, an input/output (I/O) controller may operate from 1 MHz to 500 MHz. In some embodiments, an on-chip interconnect network may operate from 1 MHz to 220 MHz. It should be noted that the operating frequency ranges of the above components are only examples, and the embodiments of the present disclosure do not specifically limit the operating frequency ranges of these components, which can be set based on actual needs.

In some embodiments, when it is determined to use the first adjustment method (i.e., the software adjustment method), the REE subsystem 320 or the TEE subsystem 330 may send the first frequency modulation request to the SE subsystem 310 through the dedicated interaction channel based on a specific policy. In some embodiments, the specific policy may be based on the traffic volume, temperature, idle time, etc. of each component, which is not limited in the embodiments of the present disclosure.

In some embodiments, when the REE subsystem 320 or the TEE subsystem 330 detects that the traffic volume of a certain component exceeds a preset threshold, the REE subsystem 320 or the TEE subsystem 330 may determine that the operating frequency of the component needs to be adjusted, and may actively send a frequency adjustment request (which may also be referred to as the first frequency modulation request in the present disclosure) to the SE subsystem 310.

In some embodiments, the REE subsystem 320 or the TEE subsystem 330 may detect the idle time of a certain processor core based on a set time interval. If the idle time is detected to be less than a preset threshold, the REE subsystem 320 or the TEE subsystem 330 may determine that the operating frequency of the processor core needs to be reduced, and may actively send a frequency adjustment request (i.e., the first frequency modulation request) to the SE subsystem 310.

In some embodiments, the first frequency modulation request may include information associated with the target component whose frequency is to be adjusted, the first requested frequency, and other relevant information. In some embodiments, the first requested frequency may be the frequency to which the REE subsystem 320 or the TEE subsystem 330 expects the target component to be adjusted to. In some embodiments, the information associated with the target component may be an identifier, a number, etc. of the target component, which is not limited in the embodiments of the present disclosure.

In some embodiments, the interaction between the REE subsystem 320, the TEE subsystem 330 and SE subsystem 310 may only be realized through a shared memory, and the REE subsystem 320 and the TEE subsystem 330 may not have direct access to the SE subsystem 310. In some embodiments, the REE subsystem 320 or the TEE subsystem 330 may write the first frequency modulation request into the shared memory, and notify the SE subsystem 310 by means of an interrupt, and then the SE subsystem 310 may read the first frequency modulation request in the shared memory. Accordingly, the SE subsystem 310 may receive the first frequency modulation request from the REE subsystem 320 or the TEE subsystem 330.

It should be noted that the interactions between the REE subsystem 320, the TEE subsystem 330, and the SE subsystem 310 may be realized through their own independent shared memory areas and notification methods, which are not limited in the embodiments of the present disclosure, and can be set based on actual needs.

In some embodiments of, after receiving the first frequency modulation request, the SE subsystem 310 may identify the target component and the first requested frequency. The SE subsystem 310 may determine whether the first requested frequency is within the operating frequency range of the target component based on the first requested frequency, determine the target frequency of the to-be-adjusted target component, and send the target frequency to the power management module 311 to adjust the target component to the target frequency.

In some embodiments, when the SE subsystem 310 detects that the first requested frequency is within the operating frequency range of the target component, the SE subsystem 310 may determine the target frequency to which the target component is to be adjusted to as the first requested frequency.

For example, the normal operating frequency range of a processor core may be 1 MHz to 3 GHZ, and the current operating frequency may be 2 GHz. Based on the requirement of the processor core to processor the workload, the REE subsystem 320 or the TEE subsystem 330 may send a frequency modulation request to the SE subsystem 310 to request to switch the frequency to 2.5 GHz. After checking, the SE subsystem 310 may determine that the request frequency (2.5 GHZ) is within the operating frequency range of the target component (e.g., within 1 MHz to 3 GHZ), approve to adjust the frequency according to the frequency modulation request, and determine the target frequency of the target component is 2.5 GHz.

In some embodiments, when the SE subsystem 310 detects that the first requested frequency is not within the operating frequency range of the target component, the SE subsystem 310 may determine the target frequency to which the target component is to be adjusted to as a correction frequency.

In some embodiments, the correction frequency may be within the operating frequency range of the target component, and the difference between the correction frequency and the first requested frequency may be less than a preset threshold. It should be noted that the embodiments of the present disclosure do not limit the specific value of the preset threshold, which can be set based on actual needs.

For example, the normal operating frequency range of a processor core may be 1 MHz to 3 GHZ, and the current operating frequency may be 2 GHz. If the processor core is maliciously attacked by an attacker, for example, the REE subsystem 320 or the TEE subsystem 330 sends a frequency modulation request to the SE subsystem 310, requesting to switch the frequency to 3.5 GHz. After checking, the SE subsystem 310 determines that the request frequency (3.5 GHZ) is outside the operating frequency range of the target component (e.g., outside the range of 1 MHz to 3 GHZ). The SE subsystem 310 may actively adjust the requested frequency and determine that the target frequency of the target component is 3 GHZ, thereby ensuring that the target component can work normally at the target frequency.

In another example, the correction frequency may be the frequency currently operated by the target frequency. That is, the SE subsystem 310 may determine that the frequency of the target component does not need to be adjusted, which means that the SE subsystem 310 may refuse to respond to the frequency modulation request (e.g., the first frequency modulation request) from the REE subsystem 320 and the TEE subsystem 330.

For example, the normal operating frequency range of a processor core may be 1 MHz to 3 GHZ, and the current operating frequency may be 2 GHz. If the processor core is maliciously attacked by an attacker, for example, the REE subsystem 320 or the TEE subsystem 330 sends a frequency modulation request to the SE subsystem 310, requesting to switch the frequency to 3.5 GHz. After checking, the SE subsystem 310 determines that the request frequency (3.5 GHZ) is outside the operating frequency range of the target component (e.g., outside the range of 1 MHz to 3 GHZ), and the SE subsystem 310 may refuse to respond to the frequency modulation request. In some embodiments, the SE subsystem 310 may write the rejection information into the corresponding shared memory, and notify the REE subsystem 320 or the TEE subsystem 330 by means of an interrupt. In some embodiments, the rejection information may include reasons for rejection, etc., which are not limited in the embodiments of the present disclosure.

In some embodiments, after the SE subsystem 310 determines the target frequency of the target component, the SE subsystem 310 may send the determined target frequency to the power management module 311. After obtaining the target frequency of the target component, the power management module 311 may adjust the frequency of the target component to the target frequency.

In some embodiments, the SE subsystem 310 may return the execution result to the requester (the REE subsystem 320 or the TEE subsystem 330) by means of the shared memory, and notify the requester (the REE subsystem 320 or the TEE subsystem 330) by means of an interrupt. In some embodiments, the execution result may include the target frequency of the target component (that is, the actual adjusted frequency), the reason for rejection, error information, etc., which are not limited in the embodiments of the present disclosure.

Figure 5:
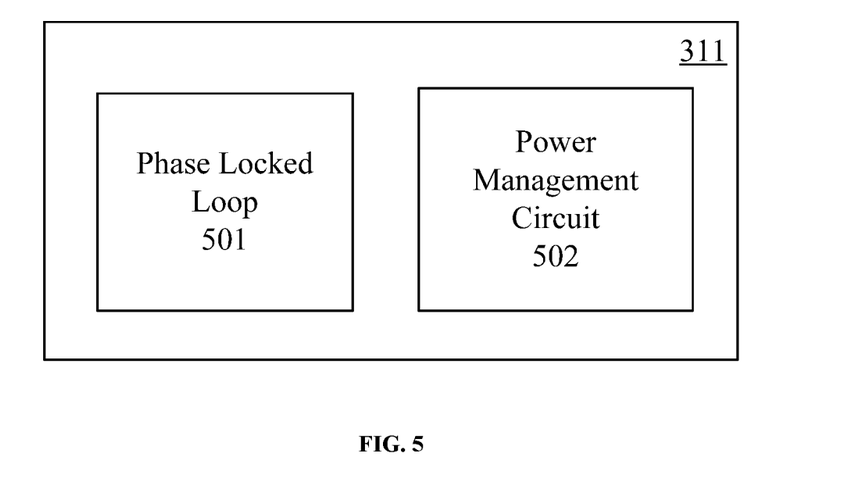
FIG. 5 is a schematic structural diagram of a power management module according to some embodiments of the present disclosure.

FIG. 5 is a schematic structural diagram of the power management module 311 according to some embodiments of the present disclosure.

In some embodiments, the power management module 311 may include a phase locked loop 501 and a power management circuit 502. In some embodiments, the phase locked loop 501 may be configured to use an externally input reference signal to control the frequency and phase of the oscillating signal inside the loop, thereby generating different frequencies to meet the requirements of different frequencies of the chip system. In some embodiments, the power management circuit 502 may be configured to provide different voltages to different components.

The power management circuit 502 may be arranged inside the SE subsystem 310 or outside the SE subsystem 310, but generally not both inside and outside the SE subsystem 310. For example, when the SE subsystem 310 includes a power management unit (PMU) with power management functions internally, an off-chip power management integrate circuit (PMIC) may not be needed. Alternatively, when the SE subsystem 310 does not include a PMU or only provides an empty shell, an off-chip PMIC may be needed to provide different voltages for each component.

It should be noted that the embodiments of the present disclosure do not limit the specific structure of the power management module, as long as the function of adjusting frequency and voltage for the target component can be realized.

Figure 6:
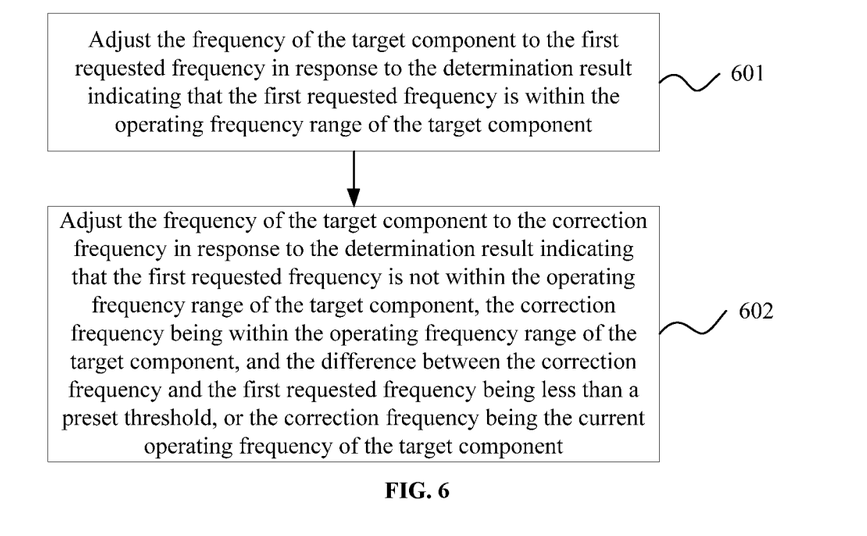
FIG. 6 is a flowchart of a method corresponding to a process at 403 according to some embodiments of the present disclosure.

FIG. 6 is a flowchart of a method corresponding to the process at 403 according to some embodiments of the present disclosure.

In some embodiments, as shown in FIG. 6, the process at 403 may include the following processes.

601, in response to the determination result indicating that the first requested frequency is within the operating frequency range of the target component, adjusting the frequency of the target component to the first requested frequency.

In some embodiments, in response to the determination result indicating that the first requested frequency is within the operating frequency range of the target component, the SE subsystem 310 may determine that the target frequency of the target component is the first requested frequency, and send the first requested frequency to the power management module 311. The power management module 311 may adjust the frequency of the target component to the first requested frequency.

Accordingly, the SE subsystem 310 can determine the target frequency of the target component based on the determination result to ensure that the target component can work normally, thereby improving the stability of the security architecture system while ensuring the security of the security architecture system.

602, in response to the determination result indicating that the first requested frequency is not within the operating frequency range of the target component, adjusting the frequency of the target component to the correction frequency. The correction frequency is within the operating frequency range of the target component, and the difference between the correction frequency and the first requested frequency is less than a preset threshold. Alternatively, the correction frequency is the current operating frequency of the target component.

In some embodiments, in response to the determination result indicating that the first requested frequency is not within the operating frequency range of the target component, the SE subsystem 310 may determine that the target frequency of the target component is the correction frequency. The correction frequency may be within the operating frequency range of the target component, and the difference between the correction frequency and the first requested frequency may be less than a preset threshold. Subsequently, the SE subsystem 310 may send the correction frequency to the power management module 311, and the power management module 311 may adjust the frequency of the target component to the correction frequency through the phase locked loop 501.

In some embodiments, in response to the determination result indicating that the first requested frequency is not within the operating frequency range of the target component, the SE subsystem 310 may determine the target frequency of the target component is the correction frequency. The correction frequency may be the frequency at which the target component is currently operating. This means that the SE subsystem 310 refuses to respond to the first frequency modulation request from either the REE subsystem or the TEE subsystem. At this time, the SE subsystem 310 does not need to send the correction frequency to the power management module 311, and the power management module 311 does not need to perform the frequency modulation operation.

Accordingly, the SE subsystem 310 can adjust or switch the target frequency of the target component based on the determination result, and maintain the necessary correlation between the frequency and voltage of the target component to ensure that the target component can work normally. Accordingly, the security of the security architecture system is ensured while the stability of the security architecture system is improved.

Figure 7:
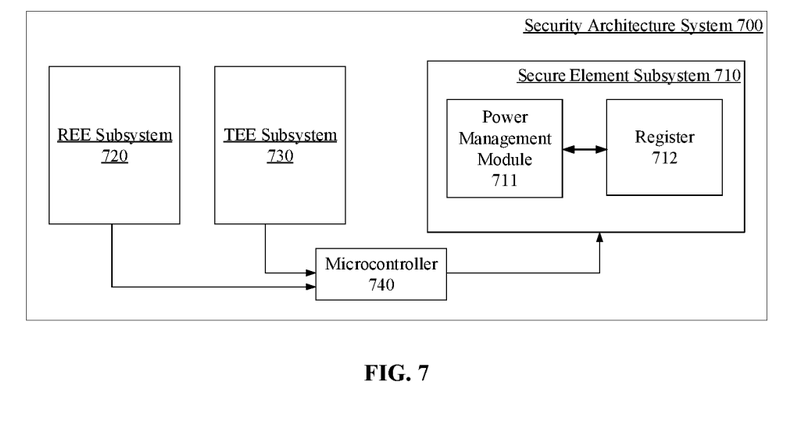
FIG. 7 is a schematic diagram of another security architecture system according to some embodiments of the present disclosure.
Figure 8:
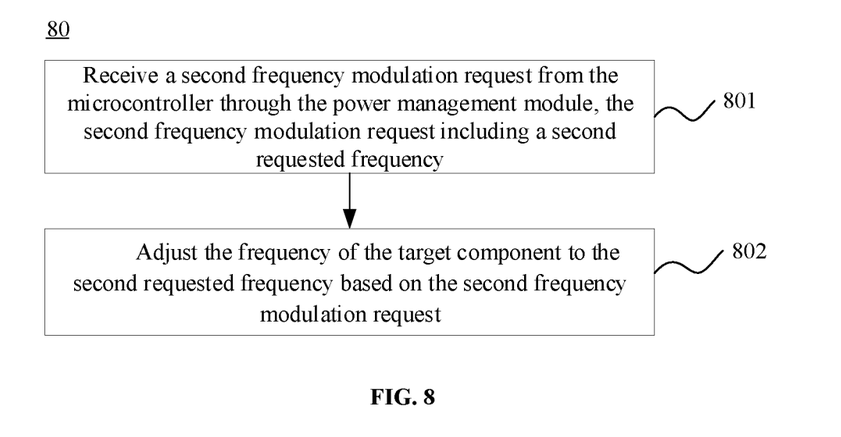
FIG. 8 is a flowchart of the data processing method adopting a second adjustment method according to some embodiments of the present disclosure.

FIG. 7 is a schematic diagram of a security architecture system 700 according to some embodiments of the present disclosure, and FIG. 8 is a flowchart of a data processing method 80 adopting a second adjustment method according to some embodiments of the present disclosure.

In some embodiments, as shown in FIG. 7, the security architecture system 700 includes a SE subsystem 710, a REE subsystem 720, and a TEE subsystem 730. The SE subsystem includes a power management module 711 and a register 712. A communication connection may be established between the power management module 711 and the register 712. The SE subsystem 710 is externally connected to a microcontroller 740, and the microcontroller 740 may be configured to receive statistical data of the target component and send a second frequency modulation request to the power management module 711 based on the statistical data.

In some embodiments, the microcontroller 740 may be a bandwidth statistics controller, and the statistical data may be the bandwidth data. It should be understood that the microcontroller 740 may also be a flow statistics controller, a temperature statistics controller, etc., which is not limited in the embodiments of the present disclosure.

In some embodiments, when the power management module 711 select the hardware adjustment method (also referred to as the second adjustment method) to adjust the frequency of the target component based on the state of the register 712, the data processing method 80 applicable to the security architecture system 700 shown in FIG. 7 may be performed. The data processing method 80 will be described in detail below.

801, receiving a second frequency modulation request from the microcontroller through the power management module, the second frequency modulation request including a second requested frequency.

802, adjusting the frequency of the target component to the second requested frequency based on the second frequency modulation request.

Take the microcontroller 740 as a bandwidth statistics controller as an example. In some embodiments, a bandwidth detection module may be arranged at the interface of each component in the REE subsystem 720 and the TEE subsystem 730. The bandwidth data of the bandwidth detection module may be sent to the bandwidth statistics controller through a bus. In some embodiments, the bandwidth detection module may send the bandwidth data of the corresponding component to the bandwidth statistics controller at a set time interval. In some embodiments, the time interval may be 5 minutes. It should be noted that the embodiments of the present disclosure do not impose specific restrictions on the time interval, which can be set based on actual needs.

When the bandwidth statistics controller receives the bandwidth data from the bandwidth detection module of the target component, the bandwidth statistics controller may compare the currently received bandwidth data with the last received bandwidth data. Based on the comparison result, the bandwidth statistics controller may determine whether to send a frequency modulation request. For example, if the currently received bandwidth data is in the same frequency range as the last received bandwidth data, the bandwidth statistics controller may not need to send the second frequency modulation request. In another example, if the currently received bandwidth data and the last received bandwidth data are not within the same frequency range, the bandwidth statistics controller may send a frequency modulation request (e.g., the second frequency modulation request) to the power management module 711 in the SE subsystem 710.

For example, for a certain component, the currently received bandwidth data may be 11 Gbps, and the last received bandwidth data may be 10 Gbps. If the bandwidth statistics controller determines that the currently received bandwidth data and the last received bandwidth data are within the same frequency range of the same gear (e.g., the bandwidth data range corresponding to the frequency range of 600 MHz to 700 MHz of the same gear may be 10 Gbps to 12 Gbps), the bandwidth statistics controller may not need to send a frequency modulation request to the power management module 711.

In another example, for a certain component, the currently received bandwidth data may be 11 Gbps, and the last received bandwidth data may be 9 Gbps. If the bandwidth statistics controller determines that the currently received bandwidth data and the last received bandwidth data are not within the same frequency range of the same gear (e.g., the bandwidth data range corresponding to the frequency range of 600 MHz to 700 MHz of the same gear may be 10 Gbps to 12 Gbps), the bandwidth statistics controller may directly send a frequency modulation request (e.g., the second frequency modulation request) to the power management module 711.

In some embodiments, the frequency modulation request from the microcontroller 740 (also referred to as the second frequency modulation request) may include information associated with the target component whose frequency is to be adjusted, the second requested frequency, and other relevant information. In some embodiments, the second requested frequency may be the frequency to which the microcontroller 740 expects the target component to be adjusted to. In some embodiments, the information associated with the target component may be an identifier, a number, etc. of the target component, which is not limited in the embodiments of the present disclosure.

In some embodiments, after receiving the second frequency modulation request from the microcontroller 740, the power management module 711 in the SE subsystem 710 may adjust the frequency of the target component to the second requested frequency.

Accordingly, the process of adjusting the frequency of the target component does not require software involvement, and the SE subsystem 710 cannot modify the frequency requested by the microcontroller 740 (i.e., the second requested frequency), which can effectively avoid malicious attacks by attackers, thereby improving the security and stability of the security architecture system.

Figure 9:
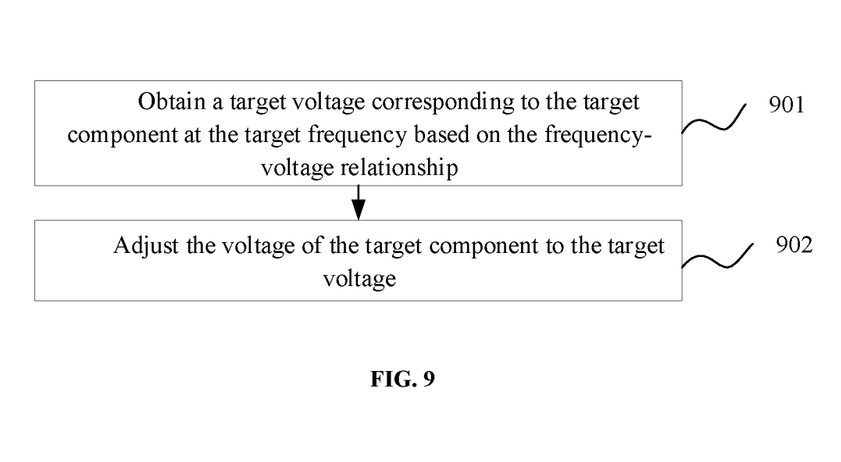
FIG. 9 is a flowchart of another data processing method according to some embodiments of the present disclosure.

FIG. 9 is a flowchart of another data processing method according to some embodiments of the present disclosure.

In some embodiments, the SE subsystems 110/310/710 may store the frequency-voltage relationship (e.g., the corresponding relationship between frequency and voltage) related to the target component, and the data processing methods 20/40/80 may further include the following processes.

901, obtaining a target voltage corresponding to the target component at the target frequency based on the frequency-voltage relationship.

902, adjusting the voltage of the target component to the target voltage.

In some embodiments, after determining the target frequency of the target component, the SE subsystems 110/310/710 may determine the target voltage corresponding to the target component at the target frequency based on the frequency-voltage relationship related to the target component, and send the target voltage to the power management modules 111/311/711. After obtaining the target voltage, the power management modules 111/311/711 may adjust the power of the target component to the target voltage through the power management circuit 502.

In some embodiments, the SE subsystems 110/310/710 may store the frequency-voltage relationship of each component. The SE subsystems 110/310/710 may be configured to determine the target frequency and target voltage of the target component, and maintain the needed correlation between the voltage and the frequency to ensure all the components can function properly, thereby improving the stability of the security architecture system.

In some embodiments, the process at 202, selecting the first adjustment method or the second adjustment method based on the state of the register, may include: selecting the first adjustment method in response to the state of the register being in a first state; and selecting the second adjustment method in response to the state of the register being in a second state.

In some embodiments, the first state of the register may be the current address stored in the register as a first value, such as "0", and the second state of the register may be the current address stored in the register as a second value, such as "1". For example, when it is detected that the value stored in the current address in the register is "0", the power management module may select the software adjustment method (the first adjustment method) to perform the frequency modulation operation. In another example, when it is detected that the value stored in the current address in the register is "0", the power management module may select the software adjustment method (the first adjustment method) to perform the frequency modulation operation. It should be noted that the embodiments of the present disclosure do not specifically limit the first state and the second state of the register, which can be set based on actual needs.

In the embodiments of the present disclosure, the register and the power management module may be both arranged in the SE subsystem withier security and may only be accessed by the SE subsystem. Therefore, the operation of selecting the hardware adjustment method or the software adjustment method may only be performed in the SE subsystem, thereby improving the security of the security architecture system.

Consistent with the present disclosure, by arranging the power management module and the register in the SE subsystem, the dynamic frequency modulation process can only be accessed by the SE subsystem with higher security, and other subsystems (e.g., the relatively lower security REE subsystem and TEE subsystem) cannot directly access the dynamic frequency modulation process. Accordingly, the security and stability of the security architecture system are improved.

Another aspect of the present disclosure further provides a security architecture system. As shown in FIG. 1, the security architecture system 100 includes a SE subsystem 110, and the SE subsystem 110 includes a power management module 111 and a register 112. A communication connection may be established between the power management module 111 and the register 112. The power management module 111 may be configured to select the first adjustment method or the second adjustment method based on the state of the register 112 to adjust the frequency of the target component.

Accordingly, by arranging the power management module 111 and the register 112 in the SE subsystem 110, the dynamic frequency modulation process may only be accessed by the SE subsystem 110, thereby improving the security and stability of the security architecture system. It should be noted that, for the above process performed by the power management module 111, reference can be made to the relevant description of the process at 202 in the above data processing method, and details will not be repeated here.

An embodiment of the present disclosure further provides a security architecture system 300. Refer to FIG. 3, compared with the security architecture system 100 shown in FIG. 1, the security architecture system 300 further includes a REE subsystem 320 and a TEE subsystem 330. When selecting the first adjustment method or the second adjustment method to adjust the frequency of the target component, the power management module 111 may be configured to obtain a target frequency of the target component based on a determination result of whether a first requested frequency is within an operating frequency range of the target component to adjust the frequency of the target component to the target frequency. The first requested frequency is included in a first frequency modulation request. The first frequency modulation request comes from the REE subsystem or the TEE subsystem.

In some embodiments, the power management module 311 obtaining the target frequency of the target component based on the determination result may include: in response to the determination result indicating that the first requested frequency is within the operating frequency range of the target component, adjusting the frequency of the target component to the first requested frequency.

Accordingly, the target frequency of the target component may be determined by the SE subsystem 310 based on the determination result to ensure that the target component can work normally, thereby providing stability of the security architecture system while ensuring the security of the security architecture system. It should be noted that, for the above process performed by the power management module 311, reference can be made to the relevant description of the process at 601 in the above data processing method, and details will not be repeated here.

In some embodiments, the power management module 311 obtaining the target frequency of the target component based on the determination result may include: in response to the determination result indicating that the first requested frequency is not within the operating frequency range of the target component, adjusting the frequency of the target component to the correction frequency. The correction frequency may be within the operating frequency range of the target component, and the difference between the correction frequency and the first requested frequency may be less than a preset threshold. Alternatively, the correction frequency may be the current operating frequency of the target component.

Accordingly, the SE subsystem 310 may adjust the target frequency of the target component based on the determination result, and maintain the needed correlation between the frequency and the voltage of the target component to ensure that the target component can function properly, thereby improving the stability of the security architecture system. It should be noted that, for the above process performed by the power management module 311, reference can be made to the relevant description of the process at 602 in the above data processing method, and details will not be repeated here.

An embodiment of the present disclosure further provides a security architecture system 700. Refer to FIG. 7, compared with the security architecture system 100 shown in FIG. 1, in the security architecture system 700, the SE subsystem 710 is externally connected to a microcontroller 740. The microcontroller 740 may be configured to receive statistical data of the target component and send a second frequency modulation request to the power management module 711 based on the statistical data. When selecting the second adjustment method to adjust the frequency of the target component, the power management module 711 may be configured to receive a second frequency modulation request from the microcontroller, and adjust the frequency of the target component to the second requested frequency based on the second frequency modulation request. The second requested frequency is included in the second frequency modulation request.

Accordingly, the process of adjusting the frequency of the target component does not require software intervention, which can effectively avoid malicious attacks by attackers, thereby improving the security and stability of the security architecture system. It should be noted that, for the above process performed by the power management module 711, reference can be made to the relevant description of the processes at 801 and 802 in the above data processing method, and details will not be repeated here.

In some embodiments, the SE subsystem 710 may store the frequency-voltage relationship associated with the target component, and the power management module 711 may be configured to obtain the target voltage corresponding to the target component at the target frequency based on the frequency-voltage relationship, and adjust the voltage of the target component to the target voltage.

Accordingly, since the frequency-voltage relationship associated with the target component is stored in the SE subsystem 710 and can only be accessed by the SE subsystem 710, the security of the security architecture system is improved. It should be noted that, for the above process performed by the power management module 711, reference can be made to the relevant description of the above data processing method, and details will not be repeated here.

In some embodiments, when selecting the first adjustment method or the second adjustment method based on the state of the register 712, the power management module 711 may be configured to select the first adjustment method in response to the state of the register 712 being in the first state; and select the second adjustment method in response to the state of the register 712 being in the second state.

Accordingly, since the register 712 is included in the SE subsystem 710, the state of the register 712 can only be accessed by the SE subsystem 710, thereby improving the security of the security architecture system. It should be noted that, for the above process performed by the power management module 711, reference can be made to the relevant description of the above data processing method, and details will not be repeated here.

It should be noted that, the security architecture systems 100/300/700 provided by the embodiments of the present disclosure may implement the foregoing data process methods 20/40/80, and may also achieve technical effects similar to the foregoing data process methods 20/40/80, which will not be repeated here.

Consistent with the present disclosure, by arranging the power management module and the register in the SE subsystem, the dynamic frequency modulation process can only be accessed by the SE subsystem with higher security, and other subsystems (e.g., the relatively lower security REE subsystem and TEE subsystem) cannot directly access the dynamic frequency modulation process. Accordingly, the security and stability of the security architecture system are improved.

Although the security architecture system and data processing method are described in conjunction with specific figures, it should be understood that various aspects of the security architecture system and data processing method may be combined and mutually applicable.

Figure 10:
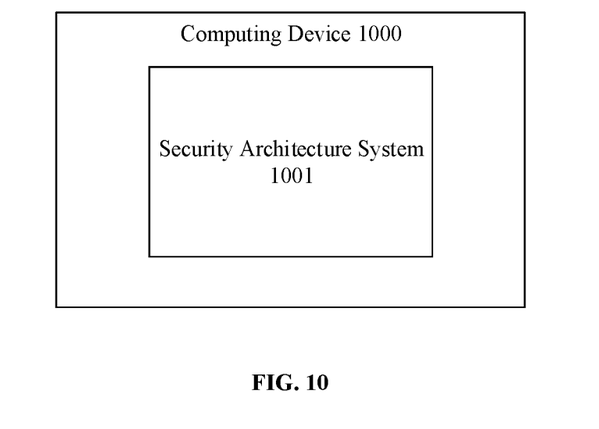
FIG. 10 is a schematic diagram of a computing device according to some embodiments of the present disclosure.

FIG. 10 is a schematic diagram of a computing device 1000 according to some embodiments of the present disclosure.

As shown in FIG. 10, the computing device 1000 includes a security architecture system 1001. In some embodiments, the security architecture system 1001 may be the security architecture system 100 shown in FIG. 1, which includes a SE subsystem 110, and the SE subsystem 110 includes a power management module 111 and a register 112. The power management module 111 may be configured to obtain the state of the register 112 and select the first adjustment method or the second adjustment method based on the state of the register 112 to adjust the frequency of the target component.

It should be noted that, the security architecture system 1001 may be the security architecture system 300 shown in FIG. 3, or may be the security architecture system 700 shown in FIG. 7, and may also include other components based on actual needs, which are not limited in the embodiments of the present disclosure.

It should be understood that the computing device 1000 provided by the embodiments of the present disclosure may implement the foregoing data processing methods 20/40/80, and may also achieve technical effects similar to the foregoing data processing methods 20/40/80, which will not be repeated here.

Figure 11:
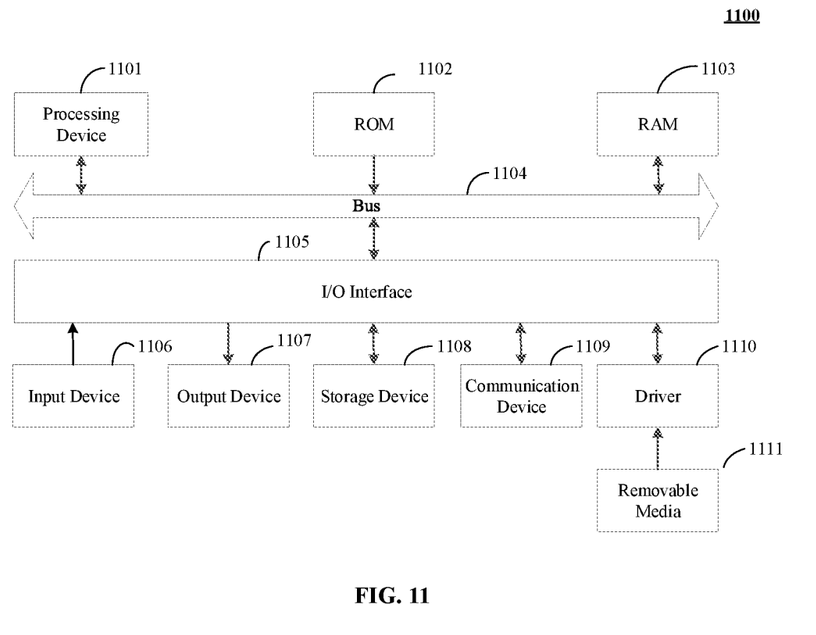
FIG. 11 is a schematic block diagram of an electronic device according to some embodiments of the present disclosure.

FIG. 11 is a schematic block diagram of an electronic device 1100 according to some embodiments of the present disclosure.

As shown in FIG. 11, the electronic device 1100 includes a processing device 1101 (such as a central processing unit, a graphics processing unit, etc.). The processing device 1101 may be configured to perform various actions and processes in accordance with programs stored in a read-only memory (ROM) 1102 or loaded into a random-access memory (RAM) 1103 from a storage 1108. In the RAM 1103, various programs and data needed for the operation of the computer system may also be stored. The processing device 1101, the ROM 1102, and the RAM 1103 may be connected to each other through a bus 1104. In addition, an input/output (I/O) interface 1105 may also be connected to the bus 1104.

The following components are connected to the I/O interface 1105: an input device 1106 including a touch screen, a touchpad, a keyboard, a mouse, a camera, a microphone, an accelerometer, a gyroscope, etc.; an output device 1107 including a liquid crystal display device (LCD), a speaker, a vibrator, etc.; a storage device 1108 including a tape, a hard disk, etc.; and a communication device 1109 including a network interface card, such as a LAN card and a modem. The communication device 1109 may facilitate the electronic device 1100 to perform wireless or wired communication with other devices to exchange data, and perform communication processes via a network, such as the Internet. A driver 1110 is also connected to the I/O interface 1105 as needed. A removable media 1111, such as a magnetic disk, an optical disk, a magneto-optical disk, and a semiconductor memory, may be installed on the driver 1110 as needed, such that computer programs read therefrom can be installed into the storage device 1108 as needed. Although FIG. 11 shows an electronic device 1100 including various devices, it should be understood that not all of the illustrated devices are required to be implemented or included. More or fewer devices may be alternatively implemented or included.

In some embodiments, the electronic device 1100 may further include a peripheral interface (not shown in FIG. 11). The peripheral interface may be various types of interfaces, such as a USB interface, a lightening interface, etc. The communication device 1109 may communication with a network and other devices by wireless communication such as the Internet, an intranet and/or a wireless network such as a cellular telephone network, a wireless local area network (LAN), and/or a metropolitan area network (MAN). The wireless communication may use any of a variety of communication standards, protocols, and technologies, including, but not limited to, the global system for mobile communications (GSM, the enhanced data GSM environment (EDGE), the wideband code division multiple access (W-CDMA), the code division multiple access (CDMA), the time division multiple access (TDMA), Bluetooth, Wi-Fi (e.g., based on IEEE 802.11a, IEEE 802.11g, and/or IEEE 802.11n standards), voice over Internet protocol (VOIP), Wi-MAX, protocols for email, instant messaging, and/or short message service (SMS), or any other suitable communication protocol.

In some embodiments, the electronic device 1100 may be any device such as a mobile phone, a tablet computer, a notebook computer, an e-book, a game console, a television, a digital photo frame, a navigator, or any combination of data processing devices and hardware, which is not limited in the embodiments of the present disclosure.

According to the embodiments of the present disclosure, the processes described above with reference to the flowcharts may be implemented as computer software programs. For example, an embodiment of the present disclosure includes a computer program product including a computer program carried on a non-transitory computer readable medium, where the computer program contains program codes for performing a method illustrated in a flowchart. In such an embodiment, the computer program may be downloaded and installed from a network via the communication device 1109, or installed from the storage device 1108, or installed from the ROM 1102. When the computer program is executed by the processing device 1101, the data processing method provided by the embodiments of the present disclosure can be performed.

The computer readable medium described above in the present disclosure may be a computer-readable signal medium, or a computer-readable storage medium, or any combination thereof. The computer readable storage medium may be, for example, but not limited to, an electrical, magnetic, optical, electromagnetic, infrared, or semiconductor system, apparatus or device, or any combination thereof. More specific examples of the computer readable storage medium may include, but are not limited to, an electrical connection with one or more wires, a portable computer disc, a hard disk, a random-access memory (RAM), a read only memory (ROM), an erasable programmable read only memory (EPROM or flash memory), an optical fiber, a portable compact disc read only memory (CD-ROM), an optical storage device, a magnetic storage device, or any suitable combination thereof. In the present disclosure, the computer readable storage medium may be any tangible medium containing or storing a program for use by or in conjunction with an instruction execution system, apparatus, or device. In the present disclosure, however, the computer readable signal medium may include a data signal propagated in a baseband or as part of a carrier wave, in which computer readable program codes are carried. Such propagated data signal may take a variety of forms, including but not limited to an electromagnetic signal, an optical signal, or any suitable combination thereof. The computer readable signal medium may also be any computer readable medium other than the computer readable storage medium. The computer readable signal medium may transmit, propagate, or transport the program for use by or in conjunction with the instruction execution system, apparatus, or device. The program codes contained on the computer readable medium may be transmitted using any suitable medium including, but not limited to, an electrical wire, an optical cable, an RF (radio frequency) and the like, or any suitable combination thereof.

In some embodiments, the client and the server may use any currently known or future developed network protocol such as hypertext transfer protocol (HTTP) to communicate, and may be interconnected with any form or medium of digital data communications (e.g., a communication network). Examples of the communication network include a local area network (LAN), a wide area network (WAN), the Internet, a peer-to-peer network (e.g., an ad hoc peer-to-peer network), and any currently known or future developed network. The computer-readable medium described above may be included in the electronic device 1100.

In the detailed description hereinabove, for purposes of explanation and not limitation, specific details are set forth in order to provide a thorough understanding of various aspects and embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on the above-mentioned computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC), and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor", "controller" or "control logic" may also be construed to refer to other hardware capable of performing such functions and/or executing software, such as the example hardware recited above.

It should be noted that the various embodiments in the present specification are described in a progressive manner, and each embodiment focuses on differences from other embodiments, and the same similar parts between the various embodiments can be referred to each other.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

If the functions described in the embodiments of the present disclosure are implemented in the form of software modules and sold or used as a standalone product, the functions can be stored in a computer readable storage medium. Based on this understanding, the technical nature of the present disclosure, part contributing to the prior art, or part of the technical solutions may be embodied in the form of a software product. The computer software product is stored in a storage medium, including several instructions to instruct a computer device (may be a personal computer, server, or network equipment) to perform all or part of the steps of various embodiments of the present. The aforementioned storage media include U disk, removable hard disk, read only memory (ROM), a random-access memory (RAM), floppy disk or CD-ROM, which can store a variety of program codes.

It should be noted that in the present disclosure, relational terms such as first and second, etc., are only used to distinguish an entity or operation from another entity or operation, and do not necessarily imply that there is an actual relationship or order between the entities or operations. The terms "comprising," "including," or any other variations are intended to encompass non-exclusive inclusion, such that a process, a method, an apparatus, or a device having a plurality of listed items not only includes these items, but also includes other items that are not listed, or includes items inherent in the process, method, apparatus, or device. Without further limitations, an item modified by a term "comprising a . . . " does not exclude inclusion of another same item in the process, method, apparatus, or device that includes the item.

It can be understood that the foregoing embodiments are merely exemplary embodiments used for describing the principle of the present disclosure, but the present disclosure is not limited thereto. Those of ordinary skill in the art may make various variations and improvements without departing from the spirit and essence of the present disclosure, and these variations and improvements shall fall into the protection scope of the embodiments of the present disclosure.

Although the embodiments of the present disclosure have been shown and described above, it can be understood that the above embodiments are exemplary and should not be construed as limitations on the present disclosure. Those skilled in the art can change, modify, substitute, or vary the above embodiments within the scope of the present disclosure. The scope of the present disclosure is defined by the appended claims and their equivalents.

What is claimed is:

1. A data processing method applicable to a security architecture system including a secure element subsystem, a rich execution environment subsystem and a trusted execution environment subsystem configured to send a first frequency modulation request to a power management module, and a microcontroller externally connected to the secure element subsystem and configured to receive statistical data of a target component and send a second frequency modulation request to the power management module included in the secure element subsystem based on the statistical data, the method comprising:

obtaining, by the power management module, a state of a register included in the secure element subsystem, wherein the secure element subsystem of the security architecture system includes the power management module, the register, and a communication connection established between the power management module and the register;

based on the state of the register, determining, at the power management module, a software adjustment method or a hardware adjustment method to adjust a frequency of the target component;

in response to the hardware adjustment method being determined, receiving, at the power management module, the second frequency modulation request from the microcontroller, the second frequency modulation request including a second requested frequency, and adjusting the frequency of the target component to the second requested frequency based on the second frequency modulation request from the microcontroller; and in response to the software adjustment method being determined, receiving, at the power management module, the first frequency modulation request from the rich execution environment subsystem or the trusted execution environment subsystem, the first frequency modulation request including a first requested frequency, modifying the first requested frequency to obtain the target frequency of the target component based on a determination result of whether the first requested frequency is within an operating frequency range of the target component including a minimum operating frequency and a maximum operating frequency, and adjusting the frequency of the target component to the target frequency.

2. The method of claim 1, wherein obtaining the target frequency of the target component based on the determination result of whether the first requested frequency is within the operating frequency range of the target component includes:

determining that the target frequency is the first requested frequency in response to the determination result indicating that the first requested frequency is within the operating frequency range of the target component.

3. The method of claim 1, wherein obtaining the target frequency of the target component based on the determination result of whether the first requested frequency is within the operating frequency range of the target component includes:

determining that the target frequency is a correction frequency in response to the determination result indicating that the first requested frequency is not within the operating frequency range of the target component, wherein the correction frequency is within the operating frequency range of the target component, and a difference between the correction frequency and the first requested frequency is less than a preset threshold; or wherein the correction frequency is a current working frequency of the target component.

4. The method of claim 1, wherein:

a frequency-voltage relationship associated with the target component is stored in the secure element subsystem; and the method further comprising:

obtaining a target voltage corresponding to the target component at the target frequency based on the frequency-voltage relationship; and adjusting a voltage of the target component to the target voltage.

5. The method of claim 1, wherein:

the target component is one or more of a processor core, an input/output controller, and an on-chip interconnection network in the security architecture system.

6. A security architecture system including a secure element subsystem, a rich execution environment subsystem and a trusted execution environment subsystem configured to send a first frequency modulation request to a power management module, and a microcontroller externally connected to the secure element subsystem and configured to receive statistical data of a target component and send a second frequency modulation request to the power management module included in the secure element subsystem based on the statistical data, the secure element subsystem comprising:

the power management module, a register, and a communication connection being established between the power management module and the register, wherein:

the power management module is configured to;

obtain a state of a register included in the secure element subsystem;

based on the state of the register, determine a software adjustment method or a hardware adjustment method to adjust a frequency of the target component;

in response to the hardware adjustment method being determined, receive the second frequency modulation request from the microcontroller, the second frequency modulation request including a second requested frequency, and adjust the frequency of the target component to the second requested frequency based on the second frequency modulation request from the microcontroller; and in response to the software adjustment method being determined, receive the first frequency modulation request from the rich execution environment subsystem or the trusted execution environment subsystem, the first frequency modulation request including a first requested frequency, modify the first requested frequency to obtain the target frequency of the target component based on a determination result of whether the first requested frequency is within an operating frequency range of the target component including a minimum operating frequency and a maximum operating frequency, and adjust the frequency of the target component to the target frequency.

7. The security architecture system of claim 6, wherein the power management module is further configured to:

adjust the frequency of the target component to the first requested frequency in response to the determination result indicating that the first requested frequency is within the operating frequency range of the target component.

8. The security architecture system of claim 6, wherein the power management module is further configured to:

adjust the frequency of the target component to a correction frequency in response to the determination result indicating that the first requested frequency is not within the operating frequency range of the target component, wherein the correction frequency is within the operating frequency range of the target component, and a difference between the correction frequency and the first requested frequency being less than a preset threshold; or wherein the correction frequency is a current working frequency of the target component.

9. The security architecture system of claim 6, wherein:

a frequency-voltage relationship associated with the target component is stored in the secure element subsystem; and the power management module is configured to:

obtain a target voltage corresponding to the target component at the target frequency based on the frequency-voltage relationship; and adjust a voltage of the target component to the target voltage.

10. A computing device comprising:

a security architecture system, the security architecture system including a secure element subsystem, a rich execution environment subsystem and a trusted execution environment subsystem configured to send a first frequency modulation request to a power management module, and a microcontroller externally connected to the secure element subsystem and configured to receive statistical data of a target component and send a second frequency modulation request to the power management module included in the secure element subsystem based on the statistical data, the secure element subsystem including a power management module, a register, and a communication connection being established between the power management module and the register, wherein the power management module is configured to:

obtain a state of a register included in the secure element subsystem;

based on the state of the register, determine a software adjustment method or a hardware adjustment method to adjust a frequency of the target component;

in response to the hardware adjustment method being determined, receive the second frequency modulation request from the microcontroller, the second frequency modulation request including a second requested frequency, and adjust the frequency of the target component to the second requested frequency based on the second frequency modulation request from the microcontroller; and in response to the software adjustment method being determined, receive the first frequency modulation request from the rich execution environment subsystem or the trusted execution environment subsystem, the first frequency modulation request including a first requested frequency, modify the first requested frequency to obtain the target frequency of the target component based on a determination result of whether the first requested frequency is within an operating frequency range of the target component including a minimum operating frequency and a maximum operating frequency, and adjust the frequency of the target component to the target frequency.

11. The computing device of claim 10, wherein the power management module is further configured to:
adjust the frequency of the target component to the first requested frequency in response to the determination result indicating that the first requested frequency is within the operating frequency range of the target component.

12. The computing device of claim 10, wherein the power management module is further configured to:
adjusting the frequency of the target component to a correction frequency in response to the determination result indicating that the first requested frequency is not within the operating frequency range of the target component,
wherein the correction frequency is within the operating frequency range of the target component, and a difference between the correction frequency and the first requested frequency being less than a preset threshold; or wherein the correction frequency is a current working frequency of the target component.

* * * * *